US008588392B2

(12) United States Patent
Karnalkar et al.

(10) Patent No.: US 8,588,392 B2
(45) Date of Patent: *Nov. 19, 2013

(54) SYSTEM FOR PROCESSING RECORDED MESSAGES

(71) Applicant: AT&T Intellectual Property I, L.P., Atlanta, GA (US)

(72) Inventors: Anup D. Karnalkar, Richardson, TX (US); James E. Jackson, Austin, TX (US); Jyotindra Shah, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,007

(22) Filed: Nov. 20, 2012

(65) Prior Publication Data

US 2013/0078957 A1 Mar. 28, 2013

Related U.S. Application Data

(63) Continuation of application No. 11/831,314, filed on Jul. 31, 2007, now Pat. No. 8,340,265.

(51) Int. Cl.
*H04M 3/42* (2006.01)

(52) U.S. Cl.
USPC ..................................... 379/201.02; 379/219

(58) Field of Classification Search
USPC .......... 379/88.01–88.28, 201.02, 220.01–241
See application file for complete search history.

(56) References Cited

U.S. PATENT DOCUMENTS

| 6,785,368 | B1 | 8/2004 | Eason et al. |
| 6,987,840 | B1 * | 1/2006 | Bosik et al. ................. 379/88.17 |
| 7,127,047 | B2 | 10/2006 | Wasmeier |
| 7,245,711 | B2 * | 7/2007 | Margolis .................. 379/209.01 |
| 7,251,313 | B1 | 7/2007 | Miller et al. |
| 7,260,207 | B2 | 8/2007 | Marsico |
| 7,457,638 | B2 | 11/2008 | Dhillon et al. |
| 7,523,165 | B2 | 4/2009 | Gourraud |
| 7,623,633 | B2 | 11/2009 | Gatzke et al. |
| 7,916,685 | B2 | 3/2011 | Schaedler et al. |
| 8,064,575 | B1 | 11/2011 | Dhanoa et al. |
| 2002/0067714 | A1 * | 6/2002 | Crain et al. ................... 370/352 |
| 2003/0152203 | A1 | 8/2003 | Berger et al. |

(Continued)

FOREIGN PATENT DOCUMENTS

| EP | 1324580 | 7/2003 |
| WO | 2006125474 | 11/2006 |
| WO | 2006125579 | 11/2006 |

*Primary Examiner* — Duc Nguyen
*Assistant Examiner* — Assad Mohammed
(74) *Attorney, Agent, or Firm* — Wolff & Samson, PC (57) ABSTRACT

A system that incorporates teachings of the present disclosure may include, for example, a network element operating in a communication system having a controller element to receive from an initiating party a message directed to a subscriber of the communication system, receive from the subscriber a request to present the message, identify the initiating party supplying the message, transmit the identity of the initiating party to a telephone number mapping (ENUM) system with a request for a communication ID of a presence system that monitors the initiating party, transmit to the presence system according to the communication ID a Session Initiation Protocol (SIP) SUBSCRIBE message requesting presence information of the initiating party, and present the subscriber one or more options to communicate with the initiating party according to the presence information received in a SIP NOTIFY message supplied by the presence system. Additional embodiments are disclosed.

18 Claims, 3 Drawing Sheets

(56) References Cited

U.S. PATENT DOCUMENTS

| | | |
|---|---|---|
| 2004/0001582 A1 | 1/2004 | Siddiqui et al. |
| 2004/0121761 A1* | 6/2004 | Tripathy et al. ............... 455/413 |
| 2004/0146144 A1 | 7/2004 | Gao et al. |
| 2004/0264456 A1 | 12/2004 | Beckmann et al. |
| 2005/0037741 A1 | 2/2005 | Gilbert |
| 2005/0123106 A1 | 6/2005 | Gao et al. |
| 2005/0232402 A1 | 10/2005 | Greve |
| 2006/0140355 A1 | 6/2006 | Handekyn |
| 2006/0148457 A1* | 7/2006 | Borella .......................... 455/415 |
| 2006/0245558 A1 | 11/2006 | Gatzke et al. |
| 2007/0027975 A1 | 2/2007 | Tai et al. |
| 2007/0043731 A1 | 2/2007 | Wu et al. |
| 2008/0198975 A1 | 8/2008 | Whitehead et al. |

* cited by examiner

SYSTEM FOR PROCESSING RECORDED MESSAGES

This application is a continuation of prior application Ser. No. 11/831,314, filed Jul. 31, 2007, which is hereby incorporated by reference.

FIELD OF THE DISCLOSURE

The present disclosure relates generally to communication techniques and more specifically to a system for processing recorded messages.

BACKGROUND

Today there are many forms of communications available to consumers. For example, consumers can call parties over landline or cellular telephony services. Consumers can also send each other text and/or multimedia messages over a Short Messaging Service (SMS), Multimedia Messaging Service (MMS), faxes, email and instant messaging (IM) service. When utilizing telephony services, it is common for calling parties to leave a voicemail message when the called party does not respond. Like SMS, MMS, faxes, and email, voicemail messages are a form of non-real time communications. This form of communications can be useful when the calling party does not need an immediate response from the called party.

A disadvantage of non-real time communications is that the calling party may no longer be accessible by way of the same form of communications used by said party. For example, when the called party retrieves a voicemail message at a much later time than when it was entered (e.g., hours or next day) the callback number left by the calling party or caller ID of the communication device used by the calling party may no longer be useful to contact the calling party.

A situation may arise when for instance the calling party leaves the voicemail message using a friend's phone with a callback number corresponding to the calling party's cell phone. After several hours, the calling party is now located at his/her home with the cell phone turned off and accepting calls only through a home phone. Selecting the option to respond to the call via caller ID (friend's home) or the callback number left by the calling party (calling party's cell phone) will not locate the calling party. Similarly, when the calling party sends an SMS, MMS, fax or email message, said party may later be in transit or at home with the communication device originally used in the off state or left in another location such as the calling party's office.

Circumstances such as these can be a frustrating and an undesirable experience for the called party.

DETAILED DESCRIPTION

In one embodiment of the present disclosure, a computer-readable storage medium can have computer instructions for receiving a request from a subscriber to retrieve a recorded message submitted by an initiating party, retrieving the recorded message, identifying the initiating party from the recorded message, transmitting a query including the identity of the initiating party to a telephone number mapping (ENUM) system, receiving from the ENUM system a unified resource locator (URL) of a presence system that monitors activities of the initiating party, submitting to the presence system according to its URL a Session Initiation Protocol (SIP) SUBSCRIBE message requesting presence information of the initiating party, receiving from the presence system a SIP NOTIFY message with the requested presence information, and presenting the subscriber one or more options to communicate with the initiating party according to the presence information.

In another embodiment of the present disclosure, a network element operating in a communication system can have a controller element to receive from an initiating party a message directed to a subscriber of the communication system, receive from the subscriber a request to present the message, identify the initiating party supplying the message, transmit the identity of the initiating party to a telephone number mapping (ENUM) system with a request for a communication ID of a presence system that monitors the initiating party, transmit to the presence system according to the communication ID a Session Initiation Protocol (SIP) SUBSCRIBE message requesting presence information of the initiating party, and present the subscriber one or more options to communicate with the initiating party according to the presence information received in a SIP NOTIFY message supplied by the presence system.

In another embodiment of the present disclosure, a presence system can have a controller element to receive from a network element of an Internet Protocol Multimedia Subsystem (IMS) communication system a Session Initiation Protocol (SIP) SUBSCRIBE message requesting presence information of a targeted party, and transmit to the network element a SIP NOTIFY message with the presence information, wherein the network element determines whether the presence information has more current options to communicate with the target party than a callback identifier received with a message supplied by the targeted party.

Figure 1:
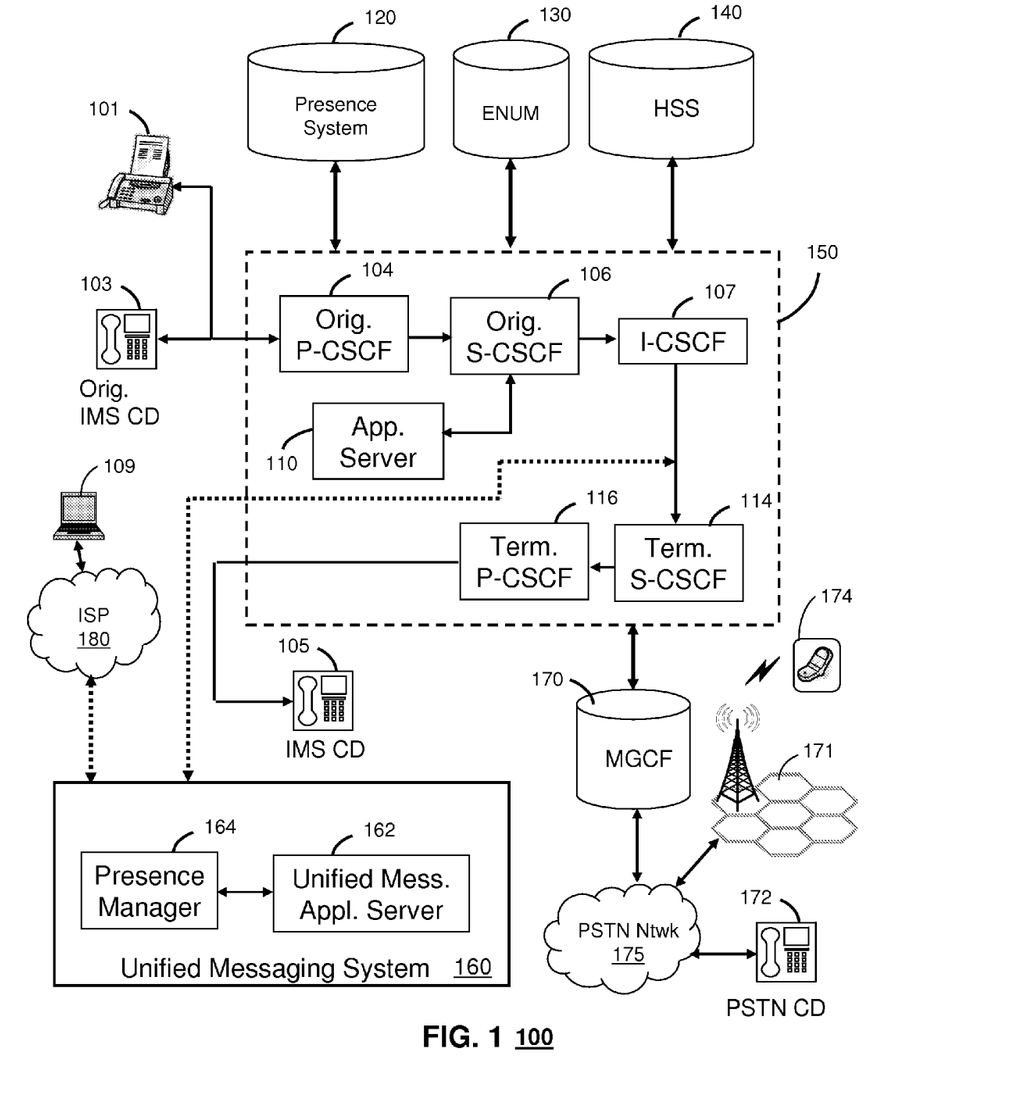
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an IMS network 150. The IMS network 150 can be coupled to IMS communication devices such as an IMS-compliant communication devices 101, 103, and 105. Public Switched Telephone Network (PSTN) devices such as a PSTN landline communication device 172 and PSTN portable communication device 174 can also be coupled to the IMS network 150 by way of a Media Gateway Control Function (MGCF) 170 coupled to a PSTN network 175. The IMS network 150 can be supplemented with an IMS-compliant Unified Messaging System (UMS) 160 that provides unified messaging services such as voicemail, email, fax, and so on.

The UMS 160 can comprise a unified messaging application server (UMAS) 162 and a presence manager 164 that utilize common computing and communication technologies to provide unified messaging services to its subscribers. The UMS 160 can receive email messages from computer terminals 109 by way of an Internet Service Provider (ISP) network 180. Faxes can be received from the IMS network from an IMS compliant fax machine such as reference 101 or from a fax machine coupled to the PSTN network 175 (not shown). Similarly, voicemail can be recorded by the UMAS 162 from calling parties using an IMS compliant communication device such as 101, 105 or a PSTN communication device such as 172 or 174.

To establish a communication session between devices, the IMS network 150 can utilize an originating Serving Call Session Control Function (S-CSCF) 106. The originating S-CSCF 106 can submit queries to the ENUM server 130 to translate an E.164 telephone number to a SIP Uniform Resource Identifier (URI) if the targeted communication device is IMS compliant. If the targeted communication device is a PSTN device such as reference 172 or 174, the ENUM server 130 will respond with an unsuccessful address resolution query and the originating S-CSCF 106 will forward the call to the MGCF 170 which connects the call through the PSTN network 175 using common signaling means such as SS7.

In the case where the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as IMS CD 105. Once identified, the I-CSCF 107 can submit the SIP INVITE message to the terminating S-CSCF 114 which then identifies a terminating P-CSCF 116 associated with the targeted communication device. The P-CSCF 116 can then signals the communication device to establish communications. When the targeted IMS communication device is the UMS 160, the HSS 140 will identify a session border controller (not shown) associated with the UMS. The I-CSCF 107 will then establish communications with the UMS 160 by way of the session border controller. The aforementioned call setup process is in part symmetrical. Accordingly, the terms "originating" and "terminating" in FIG. 1 can be interchanged.

In addition to the aforementioned network elements of the IMS network 150, a presence system 120 can be coupled to the IMS network to monitor communication activities of subscribers. The presence system 120 can utilize common computing and communication technologies to track for instance the whereabouts and status of a party having available to him/her more than one communication device for communicating with parties of communication system 100. Presence information derived from a presence system 120 can include a location of a party, the type of communication device being used by the party (e.g., cell phone, PDA, home phone, home computer, etc.), and/or a status of the party (e.g., busy, offline, actively on a call, actively engaged in instant messaging, etc.).

The presence system 120 can also determine that a party is in transit. This can be accomplished by monitoring Global Positioning System (GPS) location coordinates supplied by a GPS receiver of the communication device of the party being monitored, or by tracking a transition between cell phone base station towers. The presence system 120 can perform the foregoing presence detection techniques and other present and future presence monitoring techniques suitable to the present disclosure. Presence information can be supplied to the presence manager 164 to supplement services of subscribers of the UMS 160.

Figure 2:
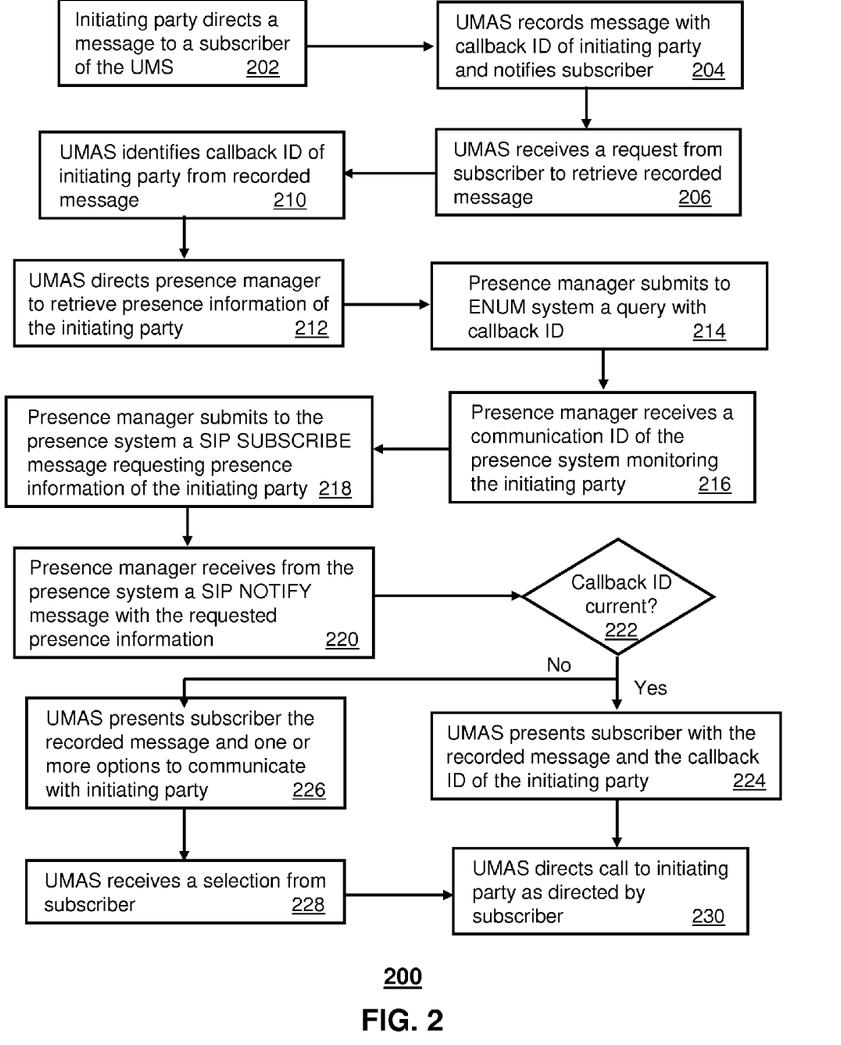
FIG. 2 depicts exemplary method operating in portions of the communication system.

FIG. 2 depicts an exemplary method 200 operating in portions of the communication system 100. Method 200 begins with step 202 in which an initiating party directs a message to a subscriber of the UMS 160. As noted earlier this message can correspond to an email message received by the UMS 160 over the ISP 180 from a computer 109, and/or a voicemail or fax message receive from the IMS network 150. In step 204, the UMAS 162 can be programmed to record the message with a callback identifier (ID) of the initiating party. The callback ID can be retrieved by the UMAS 162 utilizing common signaling techniques and/or by voice recognition techniques applied to a voicemail message with a recorded callback number. The callback ID can be represented by a telephony caller ID, an email address, or a SIP Uniform Resource Identifier (SIP URI) of the initiating party.

Once the message and callback ID have been recorded, the UMAS 162 can be programmed in the same step to notify the subscriber. Notification can be accomplished by signaling a communication device 103, 105, 172 or 174 of the subscriber by common signaling means (SIP or SS7), which in turn causes said communication device to assert an alert (e.g., a flashing icon, a pop-up message, an audible alert, etc.). Once the subscriber sees and/or hears the message alert notice, the subscriber can request by common user interface means of the communication device being used by said subscriber (e.g., cell phone, laptop computer, PDA, etc.) a presentation of the message recorded by the UMAS 162. Said request can be transmitted by the subscriber's communication device to the UMAS 162 by wired or wireless means of communication system 100. Upon receiving said request in step 206, the UMAS 162 can retrieve the recorded message and identify the callback ID (as described earlier) of the initiating party in step 210.

With the callback ID, the UMAS 162 directs in step 212 the presence manager 164 to retrieve presence information of the initiating party. The presence manager 164 can accomplish this by transmitting to the ENUM system 130 in step 214 a query message with the callback ID of the initiating party. The ENUM system 130 can in turn retrieve according to the callback ID of the initiating party a communication ID associated with the presence system 120 which the initiating party is subscribed to. The communication ID can be for example a Uniform Resource Locator (URL) or SIP URI that can be used to establish communications with the presence system 120. Upon receiving the communication ID in step 216, the presence manager 160 transmits to the presence system 120 a SIP SUBSCRIBE message requesting presence information of the initiating party. As noted earlier, the presence information can be as comprehensive as the presence system 120 is capable of generating.

In step 220, the presence manager 164 receives the presence information in the form of a SIP NOTIFY message. With the presence information, the presence manager 164 can determine in step 222 whether the callback ID remains the best means to contact the initiating party. For example, suppose the initiating party called the subscriber with his/her cell phone and recorded a voicemail message in the UMAS 162 with a caller ID or callback number in the voicemail message. The UMAS 162 can retrieve the caller ID (if available) or the callback number by voice recognition means and then compare it to the presence information to determine whether it is current. The presence information may indicate the initiating party is still utilizing his/her cell phone. In this instance, the presence manager 164 informs the UMAS 162 of this state, and in step 224 the UMAS presents the subscriber the recorded message with the callback ID of the initiating party as was provided when the initiating party supplied the recorded message.

If on the other hand, the presence information indicates the initiating party is no longer utilizing his/her cell phone but rather is at home utilizing a home phone and computer, the presence manager 162 can inform the UMAS 162 of this change, and in step 226 the UMAS presents the subscriber the recorded message with one or more options to communicate with the initiating party (e.g., home phone and/or computer). The presentation can be in the form of a voice and/or keypad interactive response application executed by the UMAS 162.

For example, the UMAS 162 can present an audible response to the subscriber such as, "The party who left this message is currently reachable via their home phone or home computer. To connect to the home phone press 1 or say home phone, or press 2 or say home computer to establish an instant messaging session with the home computer." The user can either depress numeral "1" or "2" on a keypad of his/her communication device which generates a Dual Tone Multi-Frequency (DTMF) signal detectable by the UMAS 162, or provide a voice response detectable with common voice recognition techniques. In step 230 the UMAS 162 can establish a communication session between the initiating party's communication device and the subscriber's communication device as directed by the subscriber in either of steps 224 and 228.

Method 200 thus provides a means to raise the likelihood of contacting an initiating party even when the lag time for a recorded message left by the initiating party is long (e.g., hours or days) and said party has transition between communication devices.

Upon reviewing the embodiments disclosed, it would be evident to an artisan with ordinary skill in the art that said embodiments can be modified, reduced, or enhanced without departing from the scope and spirit of the claims described below. Accordingly, the reader is directed to the claims for a fuller understanding of the breadth and scope of the present disclosure.

Figure 3:
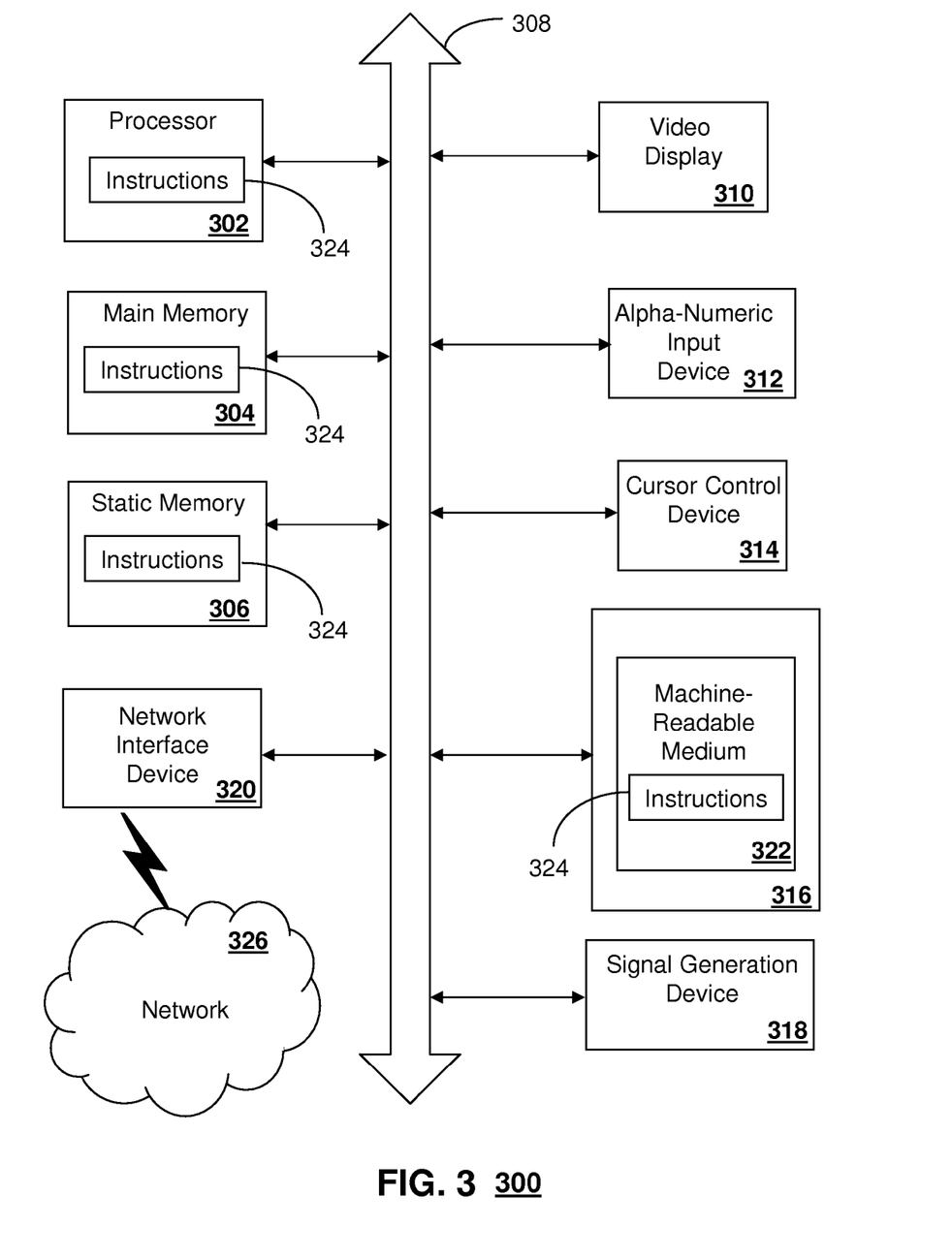
FIG. 3 depicts an exemplary diagrammatic representation of a machine in the form of a computer system within which a set of instructions, when executed, may cause the machine to perform any plurality of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a mass storage medium 316, a signal generation device 318 (e.g., a speaker or remote control) and a network interface device 320.

The mass storage medium 316 may include a computer-readable storage medium 322 on which is stored one or more sets of instructions (e.g., software 324) embodying any one or more of the methodologies or functions described herein, including those methods illustrated above. The computer-readable storage medium 322 can be an electromechanical medium such as a common disk drive, or a mass storage medium with no moving parts such as Flash or like non-volatile memories. The instructions 324 may also reside, completely or at least partially, within the main memory 304, the static memory 306, and/or within the processor 302 during execution thereof by the computer system 300. The main memory 304 and the processor 302 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the computer-readable storage medium 322 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium having program instructions stored thereon, which, when executed by a processor, cause the processor to perform operations comprising:
   retrieving a recorded message submitted by an initiating party using a first communication device;
   obtaining a callback number from the recorded message;
   transmitting to a presence system not associated with the initiating party a request for presence information of the initiating party based on the callback number;
   receiving presence information indicating a second communication device associated with the initiating party at a current location;
   comparing the callback number to the presence information to determine if the callback number is associated with the second communication device;
   in response to determining that the callback number is associated with the second communication device, presenting the recorded message to a subscriber; and
   in response to determining that the callback number is not associated with the second communication device, providing to the subscriber an option to establish a communication session between the subscriber and the initiating party via the second communication device.

2. The non-transitory computer-readable storage medium of claim 1, the operations further comprising:
   using a voice recognition technique to obtain the callback number from the recorded message.

3. The non-transitory computer-readable storage medium of claim 1, wherein the recorded message comprises one among an email message and a voicemail message.

4. The non-transitory computer-readable storage medium of claim 1, the operations further comprising:
   identifying the initiating party according to a callback identifier included in the recorded message.

5. The non-transitory computer-readable storage medium of claim 4, wherein the callback identifier comprises one among a caller identifier, an email address, and a Session Initiation Protocol Uniform Resource Identifier.

6. The non-transitory computer-readable storage medium of claim 1, the operations further comprising:
   establishing the communication session between the subscriber and the initiating party via the second communication device, in response to a selection of the option.

7. A method of managing messages in a communications system, the method comprising:
   retrieving a recorded message submitted by an initiating party using a first communication device;
   obtaining a callback number from the recorded message;
   transmitting to a presence system not associated with the initiating party a request for presence information of the initiating party based on the callback number;
   receiving presence information indicating a second communication device associated with the initiating party at a current location;
   comparing the callback number to the presence information to determine if the callback number is associated with the second communication device; and
   in response to determining that the callback number is associated with the second communication device, presenting the recorded message to a subscriber; and
   in response to determining that the callback number is not associated with the second communication device, providing to the subscriber an option to establish a communication session between the subscriber and the initiating party via the second communication device.

8. The method of claim 7, further comprising:
   using a voice recognition technique to obtain the callback number from the recorded message.

9. The method of claim 7, wherein the recorded message comprises one among an email message and a voicemail message.

10. The method of claim 7, further comprising:
    identifying the initiating party according to a callback identifier included in the recorded message.

11. The method of claim 10, wherein the callback identifier comprises one among a caller identifier, an email address, and a Session Initiation Protocol Uniform Resource Identifier.

12. The method of claim 7, further comprising:
establishing the communication session between the subscriber and the initiating party via the second communication device, in response to a selection of the option.

13. A system comprising:
a memory storing computer program instructions; and
a processor communicatively coupled to the memory, the processor configured to execute the computer program instructions, which, when executed on the processor, cause the processor to perform operations comprising:
retrieving a recorded message submitted by an initiating party using a first communication device;
obtaining a callback number from the recorded message;
transmitting to a presence system not associated with the initiating party a request for presence information of the initiating party based on the callback number;
receiving presence information indicating a second communication device associated with the initiating party the initiating party at a current location;
comparing the callback number to the presence information to determine if the callback number is associated with the second communication device; and
in response to determining that the callback number is associated with the second communication device, presenting the recorded message to a subscriber; and
in response to determining that the callback number is not associated with the second communication device, providing to the subscriber an option to establish a communication session between the subscriber and the initiating party via the second communication device.

14. The system of claim 13, the operations further comprising:
using a voice recognition technique to obtain the callback number from the recorded message.

15. The system of claim 13, wherein the recorded message comprises one among an email message and a voicemail message.

16. The system of claim 13, the operations further comprising:
identifying the initiating party according to a callback identifier included in the recorded message.

17. The system of claim 16, wherein the callback identifier comprises one among a caller identifier, an email address, and a Session Initiation Protocol Uniform Resource Identifier.

18. The system of claim 13, the operations further comprising:
establishing the communication session between the subscriber and the initiating party via the second communication device, in response to a selection of the option.

* * * * *

UNITED STATES PATENT AND TRADEMARK OFFICE
CERTIFICATE OF CORRECTION

PATENT NO. : 8,588,392 B2
APPLICATION NO. : 13/682007
DATED : November 19, 2013
INVENTOR(S) : Anup D. Karnalkar et al.

Page 1 of 1

It is certified that error appears in the above-identified patent and that said Letters Patent is hereby corrected as shown below:

In the Claims

In Claim 13, column 9, lines 20-21, "associated with the initiating party the initiating party at a current location;" should read --associated with the initiating party at a current location;--.

Signed and Sealed this
Fifteenth Day of April, 2014

Michelle K. Lee
*Deputy Director of the United States Patent and Trademark Office*